S. FORSTER.
FISHING HOOK.
APPLICATION FILED MAR. 4, 1916.
1,206,689.
Patented Nov. 28, 1916.
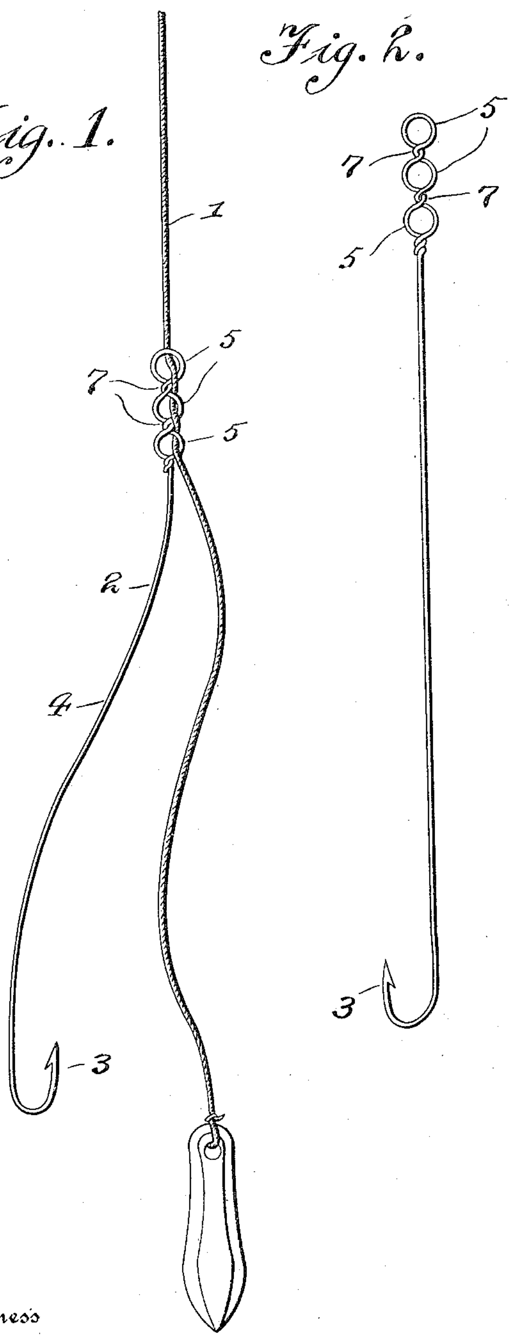
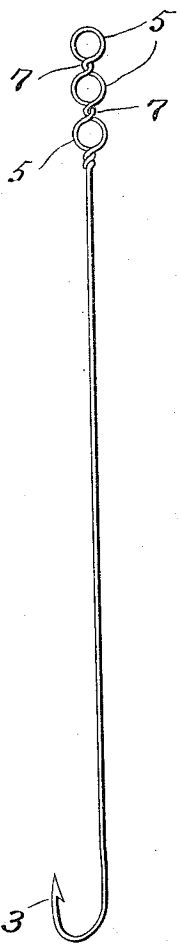
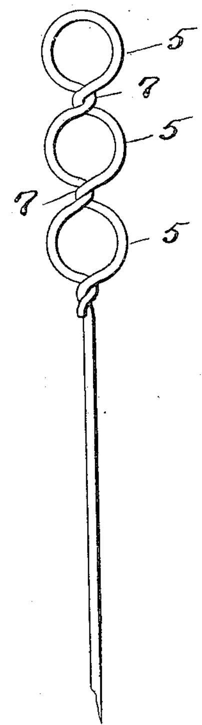
Inventor
S. Forster.
Witness
C. J. Maddox
By Victor J. Evans
Attorney
THE NORRIS PETERS CO., PHOTO-LITHO., WASHINGTON, D. C.

UNITED STATES PATENT OFFICE.

SEBASTIAN FORSTER, OF BROOKLYN, NEW YORK.

FISHING-HOOK.

1,206,689. Specification of Letters Patent. Patented Nov. 28, 1916.

Application filed March 4, 1916. Serial No. 82,153.

*To all whom it may concern:*

Be it known that I, SEBASTIAN FORSTER, a citizen of the United States, residing at Brooklyn, in the county of Kings and State of New York, have invented new and useful Improvements in Fishing-Hooks, of which the following is a specification.

This invention relates to improvements in fishing hooks especially to a snood therefor, and the primary object of the invention is to construct a hook whereby the same may be readily applied to a line and held in an adjusted position upon the said line without the necessity of forming loops or knots in the line.

A further object of the invention is to construct a fishing hook having an integral snood, the same being formed at its end with a plurality of integrally formed spaced eyes each arranged in the same plane, whereby the line will be fed through a number of the said eyes and gripped by the connection between the eyes, so as to easily position the hook upon the said line and retain the said hook in an adjusted position upon the said line.

With the above and other objects in view, the improvement resides in the construction, combination and arrangement of parts set forth in the following specification and falling within the scope of the appended claim.

In the drawing: Figure 1 is a view illustrating the hook constructed in accordance with my invention having its snood secured, Fig. 2 is a perspective view of the hook detached, and Fig. 3 is an enlarged plan view of the end of the snood.

In the drawings the numeral 1 designates a fishing line having a sinker attached to one of its ends.

The numeral 2 designates my improvement. The improvement comprises a hook proper indicated by the numeral 3 and an integrally formed snood 4. The snood is constructed of some flexible material, such as a strand of wire, but the hooked end of the device may be tempered and non-yieldable. The end of the snood is twisted upon itself to provide a plurality of eyes 5, not less than three in number and all of the eyes have their flat portions arranged in the same plane. The strand of wire is curved to provide the eyes and is twisted, as at 7, between the adjacent eyes, and this twisted portion 7 is adapted to contact with the line 1 which is fed or threaded through all of the eyes and the looped or grooved portions of the line and frictionally contacted by the coiled portions between the eyes as well as the opposite ends of the said eyes, so that the snood and hook is effectively sustained upon the line in proper adjusted position, and cannot be accidentally removed from said position except by the hand of the operator.

From the above description, taken in connection with the accompanying drawings, the simplicity of the device as well as the advantages thereof will, it is thought, be perfectly apparent to those skilled in the art to which such invention appertains without further detailed description.

Having thus described the invention, what I claim is:

A fishing hook including an integral snood of flexible wire, the end of the said wire being bent to provide a plurality of loops forming eyes, the eyes being not less than three in number and being all arranged in the same longitudinal plane.

In testimony whereof I affix my signature in presence of two witnesses.

SEBASTIAN FORSTER.

Witnesses:
WILLIAM F. COYNE,
WALTER J. BURKE.

Copies of this patent may be obtained for five cents each, by addressing the "Commissioner of Patents, Washington, D. C."